(12) United States Patent
Nguyen et al.

(10) Patent No.: US 9,369,868 B2
(45) Date of Patent: Jun. 14, 2016

(54) SYSTEM AND METHOD FOR SECURE WIRELESS COMMUNICATIONS BETWEEN A VEHICLE AND A SOURCE

(71) Applicant: The Boeing Company, Chicago, IL (US)

(72) Inventors: Daniel Nguyen, Auburn, WA (US); Jason W. Shelton, Edgewood, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/519,269

(22) Filed: Oct. 21, 2014

(65) Prior Publication Data

US 2016/0112873 A1   Apr. 21, 2016

(51) Int. Cl.
| | | |
|---|---|---|
| *H04M 1/66* | (2006.01) | |
| *H04W 12/06* | (2009.01) | |
| *H04B 7/185* | (2006.01) | |

(52) U.S. Cl.
CPC ........... *H04W 12/06* (2013.01); *H04B 7/18506* (2013.01)

(58) Field of Classification Search
CPC ..... H04L 27/2665; H04L 12/18; H04L 25/08; H04L 27/2657; H04N 5/4401; H04N 5/455; H04N 21/42607; H04N 21/41422; H04W 76/002
USPC ........................................................ 455/411
See application file for complete search history.

(56) References Cited

U.S. PATENT DOCUMENTS

| | | | | |
|---|---|---|---|---|
| 5,602,916 | A | * | 2/1997 | Grube ..................... H04L 12/22 380/270 |
| 8,380,383 | B2 | * | 2/2013 | Preston ................... B60R 25/00 701/24 |
| 8,767,537 | B1 | | 7/2014 | Sampigethaya |
| 2011/0065400 | A1 | * | 3/2011 | Teikari ..................... G01S 3/20 455/129 |
| 2012/0265509 | A1 | * | 10/2012 | Mier ..................... F41C 33/046 703/8 |
| 2013/0151088 | A1 | * | 6/2013 | Ricci ....................... G06F 17/00 701/51 |
| 2013/0166910 | A1 | * | 6/2013 | Wilkinson ............ H04W 12/04 713/168 |

FOREIGN PATENT DOCUMENTS

| | | |
|---|---|---|
| EP | 2040392 A2 | 3/2009 |
| EP | 2315367 A1 | 4/2011 |
| WO | 2013/013243 A1 | 1/2013 |

OTHER PUBLICATIONS

Krishna Sampigethaya Et Al: "Enhancing the 'Last Mile' Communications at Airports", International Congress of the Aeronautical Sciences, Sep. 28, 2012, pp. 1-10.
European Search Report for EP 15182195, Mar. 17, 2016.

* cited by examiner

*Primary Examiner* — Juan A Torres

(57) ABSTRACT

A method and system for securely wirelessly communicating between a vehicle and a source are provided. Information regarding a vehicle or a source is provided with at least one information device. Wireless communications of data between a first wireless communication device of the vehicle and a second wireless communication device of the source are only allowed when security parameters are met based on the information provided by the at least one information device.

27 Claims, 4 Drawing Sheets

SYSTEM AND METHOD FOR SECURE WIRELESS COMMUNICATIONS BETWEEN A VEHICLE AND A SOURCE

FIELD OF THE DISCLOSURE

This disclosure relates to systems and methods for ensuring secure wireless communications between a vehicle and a source.

BACKGROUND

Vehicles such as aircraft often wirelessly communicate with other sources. During this wireless communication, security-critical information regarding the vehicle or the source may need to be communicated. It is important to ensure that this data is only wirelessly communicated between the intended vehicle and source to prevent unauthorized use of the data by hackers. In the past, hackers have attempted to eavesdrop on wireless communications between a vehicle and a source by forming an independent connection between the vehicle and the source without being detected.

A system and method is needed to ensure secure wireless communications between a vehicle and a source.

SUMMARY

In one embodiment of the disclosure, a system for secure wireless communications is disclosed. The system includes a first wireless communication device, a vehicle, a second wireless communication device, a source, at least one information device, at least one processor, at least one memory, programming code, and security parameters. The first wireless communication device is configured to be disposed on the vehicle. The second wireless communication device is configured to be disposed on a source and to wirelessly communicate data with the first wireless communication device. The at least one information device is configured to provide information regarding the vehicle or the source. The at least one processor is in electronic communication with the at least one information device. The at least one memory is in electronic communication with the at least one processor. The at least one memory includes the programming code for execution by the at least one processor. The programming code is configured to only allow wireless communications of the data between the first wireless communication device and the second wireless communication device when the security parameters, stored in the at least one memory, regarding the vehicle or the source are met based on the information provided by the at least one information device.

In another embodiment, a non-transitory computer readable medium is disclosed. The non-transitory computer readable medium includes programming code to command a processor to only allow wireless communications of data between a first wireless communication device of a vehicle and a second wireless communication device of a source when security parameters regarding the vehicle or the source are met based on information provided by at least one information device.

In still another embodiment, a method for securely wirelessly communicating is disclosed. In one step, information regarding a vehicle or a source is provided with at least one information device. In another step, wireless communications of data between a first wireless communication device of the vehicle and a second wireless communication device of the source are only allowed when security parameters are met based on the information provided by the at least one information device.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
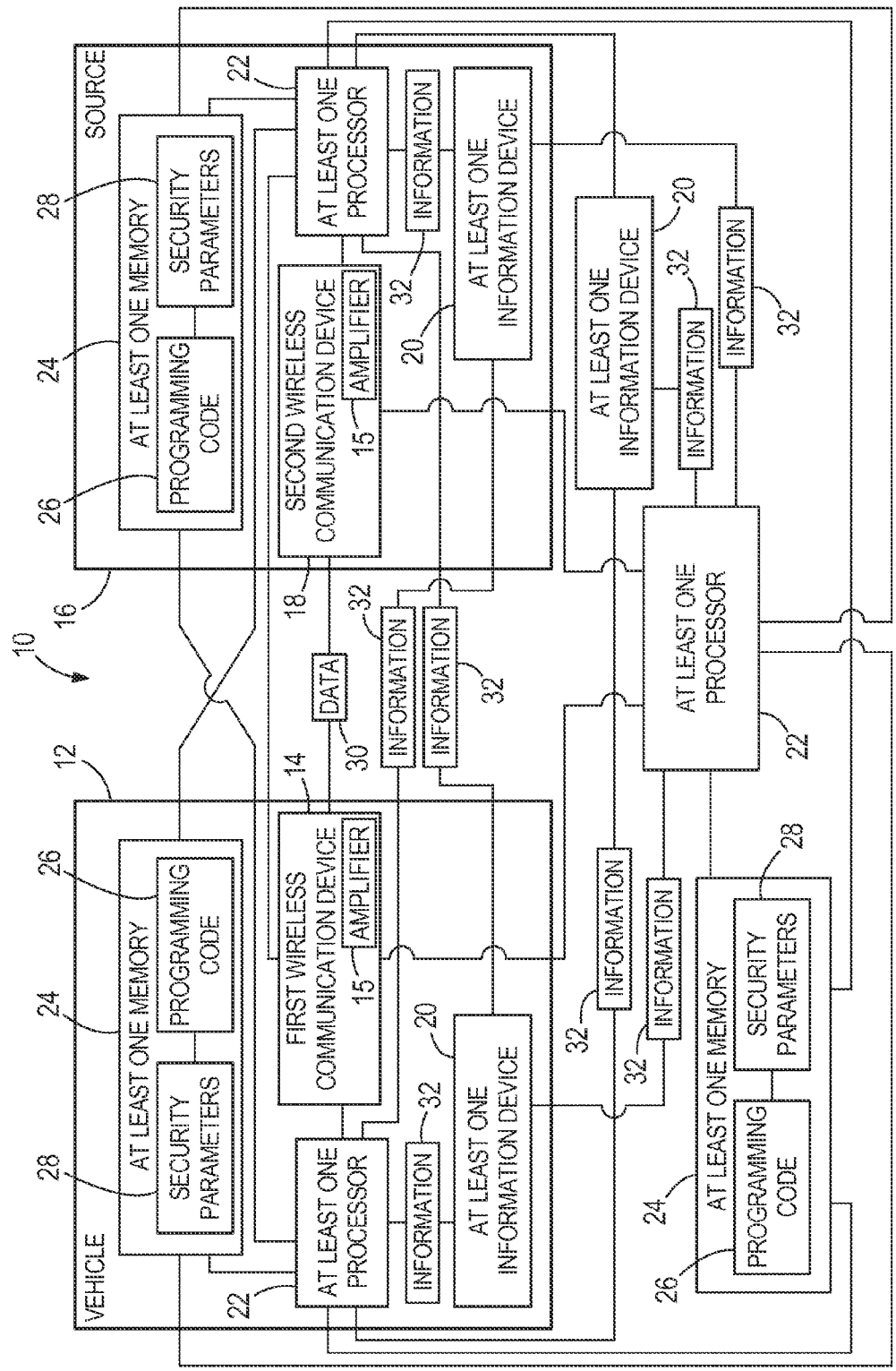
FIG. 1 illustrates one embodiment of a box diagram of a system for secure wireless communications between a vehicle and a source.

FIG. 1 illustrates one embodiment of a box diagram of a system 10 for secure wireless communications between a vehicle 12 and a source 16. The system 10 includes the vehicle 12, a first wireless communication device 14 which includes an amplifier 15, the source 16, a second wireless communication device 18 which includes an amplifier 15, at least one information device 20, at least one processor 22, and at least one memory 24 containing programming code 26 and security parameters 28. In other embodiments, the system 10 may contain a varying number or type of the components in differing configurations.

The vehicle 12 may comprise an aircraft. In other embodiments, the vehicle 12 may vary. The first wireless communication device 14 may be disposed on the vehicle 12. The second wireless communication device 18 may be disposed on the source 16. The second wireless communication device 18 is configured to wirelessly communicate data 30 with, to, from, or between the first wireless communication device 14. The amplifiers 15 of the first and second wireless communication devices 14 and 18 are configured to amplify the wireless signal transmitting the data 30. The source 16 may comprise an aircraft terminal, a land or sea based antenna, an air-traffic control system, an aircraft, or a satellite. In other embodiments, the source 16 may vary.

The at least one information device 20 is configured to provide information 32 regarding the vehicle 12 or the source 16 to the at least one processor 22. The at least one information device 20 may comprise a radio-frequency identification device configured to provide information 32 comprising an identification of the vehicle 12 or the source 16, a proximity sensor configured to provide information 32 comprising a location and/or a distance of/between the vehicle 12 and the source 16, a security-code providing device configured to provide information 32 comprising a security-code, a sensor configured to provide information regarding the vehicle 12 and/or source 16 (such as a sensor which determines dimensions of the vehicle 12 to identify the vehicle 12 based on the detected dimensions, or another type of sensor which provides varying information regarding the vehicle 12 and/or the source 16), or another type of information device 20 configured to provide varying types of information 32. In the instant embodiment, the at least one information device 20 comprises a plurality of information devices 20 with one of the information devices 20 attached to the vehicle 12, one of the information devices 20 attached to the source 16, and one of the information devices 20 disposed apart from the vehicle 12 and the source 16. In other embodiments, any number, type, configuration, or location of the at least one information device 20 may be used to provide varying types of information 32 to the at least one processor 22.

The at least one processor 22 is in electronic communication with the at least one information device 20, the first wireless communication device 14, and with the second wireless communication device 18. In the instant embodiment, the at least one processor 22 comprises a plurality of processors 22 with one of the processors 22 attached to the vehicle 12, one of the processors 22 attached to the source 16, and one of the processors 22 disposed apart from the vehicle 12 and the source 16. In other embodiments, the at least one processor 22 may vary in number, location, or type.

The at least one memory 24 (also referred to herein as a non-transitory computer readable medium) is in electronic communication with the at least one processor 22. The at least one memory 24 contains the programming code 26 for execution by the at least one processor 22. In the instant embodiment, the at least one memory 24 comprises a plurality of memories 24 with one of the memories 24 contained in the vehicle 12, one of the memories 24 contained in the source 16, and other of the memories contained apart from the vehicle 12 and the source 16. In other embodiments, the at least one memory 24 may vary in number, location, or type. The programming code 26 is configured to only allow wireless communications of the data 30 between the first wireless communication device 14 and the second wireless communication device 18 when the security parameters 28, stored in the at least one memory 24, regarding the vehicle 12 or the source 16 are met based on the information 32 provided by the at least one information device 20. The programming code 26 is configured to allow the amplifiers 15 of the first and second wireless communication devices 14 and 18 to amplify the wireless signal transmitting the data 30 if the security parameters 28 are met by all vehicles and/or by all sources (including vehicle 12 and any other vehicles and/or including source 16 and any other sources) within the amplified wireless transmission zone.

In one embodiment, the security parameters 28 may comprise a location or a distance requirement of/between the vehicle 12 and the source 16. In another embodiment, the security parameters 28 may comprise an identification of the vehicle 12 or the source 16. In an additional embodiment, the security parameters 28 may comprise a time when the vehicle 12 or the source 16 should be at a certain location. In still another embodiment, the security parameters 28 may comprise a security code. In yet another embodiment, the security parameters 28 may vary in number or type. In one embodiment, the security parameters 28 which must be met in order for wireless communications to take place between the vehicle 12 and the source 16 may vary in a number of conditions which must be met for different types of the data 30.

In one embodiment, the data 30 may comprise passenger inflight entertainment data, aircraft information system data, and/or aircraft control data. When the data 30 comprises the aircraft control data, the security parameters 28 may have the most conditions which must be met before wireless communications take place. When the data 30 comprises the inflight entertainment data, the security parameters 28 may have the least conditions which must be met before wireless communications take place. When the data 30 comprises the aircraft information, the security parameters 28 may have an intermediate level of the conditions which must be met before the wireless communications take place.

Figure 2:
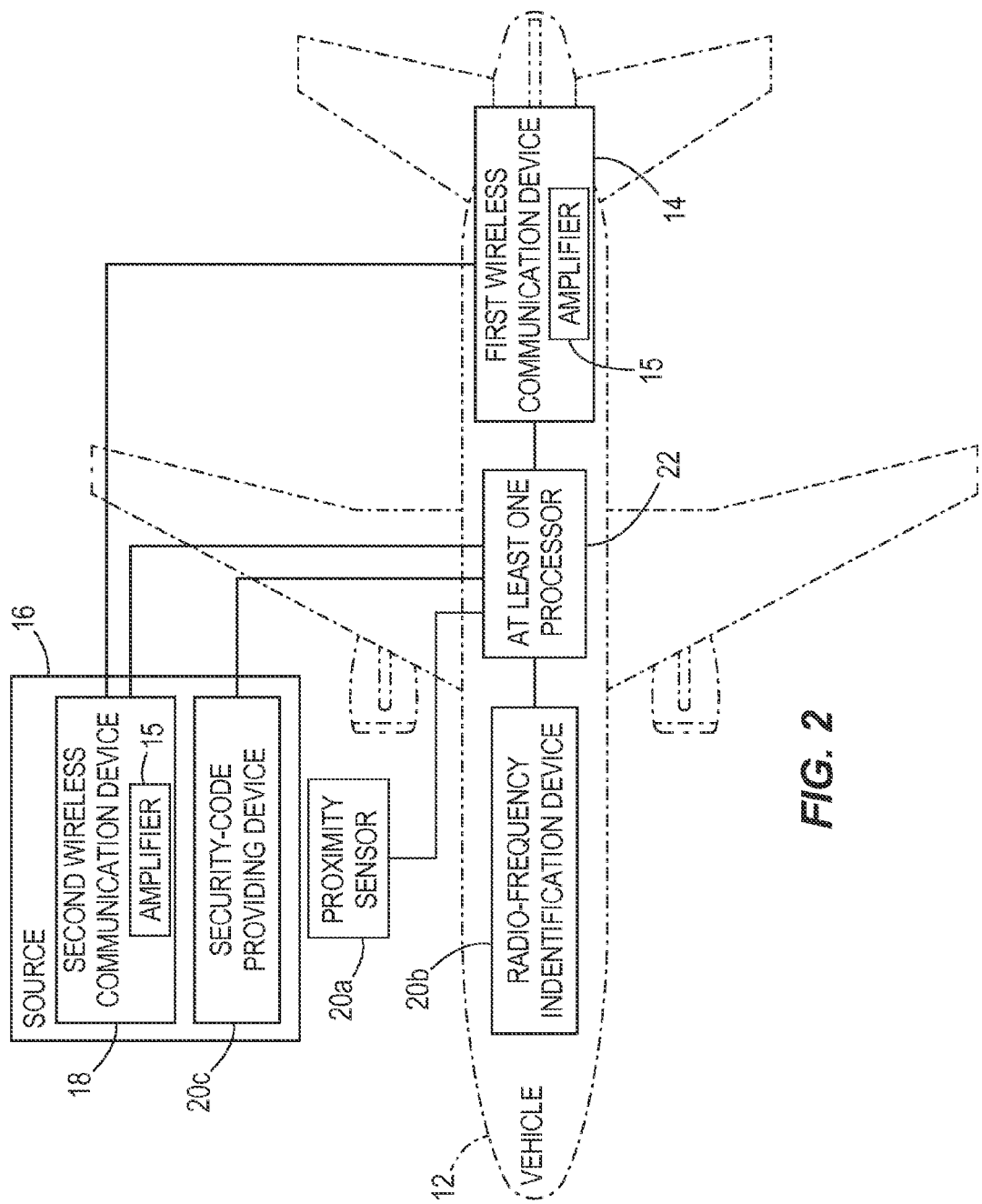
FIG. 2 illustrates one embodiment implementing a variation of the system of FIG. 1 in which the vehicle is an aircraft and the source is a portable maintenance device.

FIG. 2 illustrates one embodiment implementing a variation of the system of FIG. 1 in which the vehicle 12 is an aircraft and the source 16 is a portable maintenance device.

In one embodiment, the one information device is a new discrete (e.g., a security discrete), that is used for security verifications prior to establishing a wireless connection, and the wireless connection is external to the physical structure of the airplane, as conventional airplane discretes can only account for information that is physically related to each airplane. This new security discrete limits exposure to cyber attacks outside of the airplane.

Advantageously, the security that can be leveraged from embodiments described herein (e.g., the system 10 shown in FIG. 1) has tremendous value. In some embodiments, cyber attacks from outside the vehicle 12 (e.g., an airplane) are reduced by requiring the source of the attacks to be within a certain distance, which decreases the exposures to a few seconds. As an example, currently a wireless connection between an aircraft and the backoffice/gatelink has the potential to be exposed to a man-in-the middle attack due to its massive attack surface, where a man in the middle attack is a cyber attack where the attacker eavesdrops on wireless communication by forming an independent connection between the victims and relays messages between them. Embodiments described herein allow the aircraft to initiate the wireless connections when the plane is only within a predetermined value for proximity; thus decreasing the exposure to be cyber attacked to a few seconds.

As shown in FIG. 2, the at least one information device 20 comprises a proximity sensor 20*a* which senses the distance between the vehicle 12 and the source 16, a radio-frequency identification device 20*b* which provides an identification of the vehicle 12, and a security-code providing device 20*c* which provides a security code linked to the vehicle 12 and/or the source 16. The at least one processor 22 will allow the first wireless communication device 14 of the vehicle 12 and the second wireless communication device 18 of the source 16 to begin wirelessly communicating, to make contact with one another but not transfer aircraft control data, when the distance between the vehicle 12 and the source 16 is less than or equal to a required distance threshold. The at least one processor 22 will not allow wireless communications of aircraft control data between the first wireless communication device 14 of the vehicle 12 and the second wireless communication device 18 of the source 16 until the distance between the vehicle 12 and the source 16 is less than or equal to a required distance threshold, until the vehicle 12 is identified as being the particular aircraft which needs to be maintained, and until the security code associated with that vehicle 12 and/or source 16 has been confirmed. The at least one processor 22 will only allow the amplifiers 15 of the first and second wireless communication devices 14 and 18 to amplify the wireless signal transmitting the aircraft control data if the security parameters are met by all vehicles and/or by all sources (including vehicle 12 and any other vehicles and/or including source 16 and any other sources) within the amplified wireless transmission zone. In other embodiments, a varying number and type of the at least one information device 20 providing varying types of information may be used in conjunction with the at least one processor 22 requiring varying security parameters to be met based on the type of data to be wirelessly communicated between the first wireless communication device 14 of the vehicle 12 and the second wireless communication device 18 of the source 16 before allowing the wireless communications of the data.

For instance, in one embodiment the at least one information device 20 may comprise a sensor which detects dimensions of the vehicle 12 to identify the vehicle 12 based on the detected dimensions. For instance, different types of aircraft have different known dimensions for landing gear, wingtip distance, tail height distance, etc. Based on the dimensions of the aircraft which are detected by the sensor, the particular type of aircraft can be identified and that identification can be used to fulfill an identification security parameter required for wireless communication for a particular type of data. In still other embodiments, the at least one information device 20 may further vary.

Figure 3:
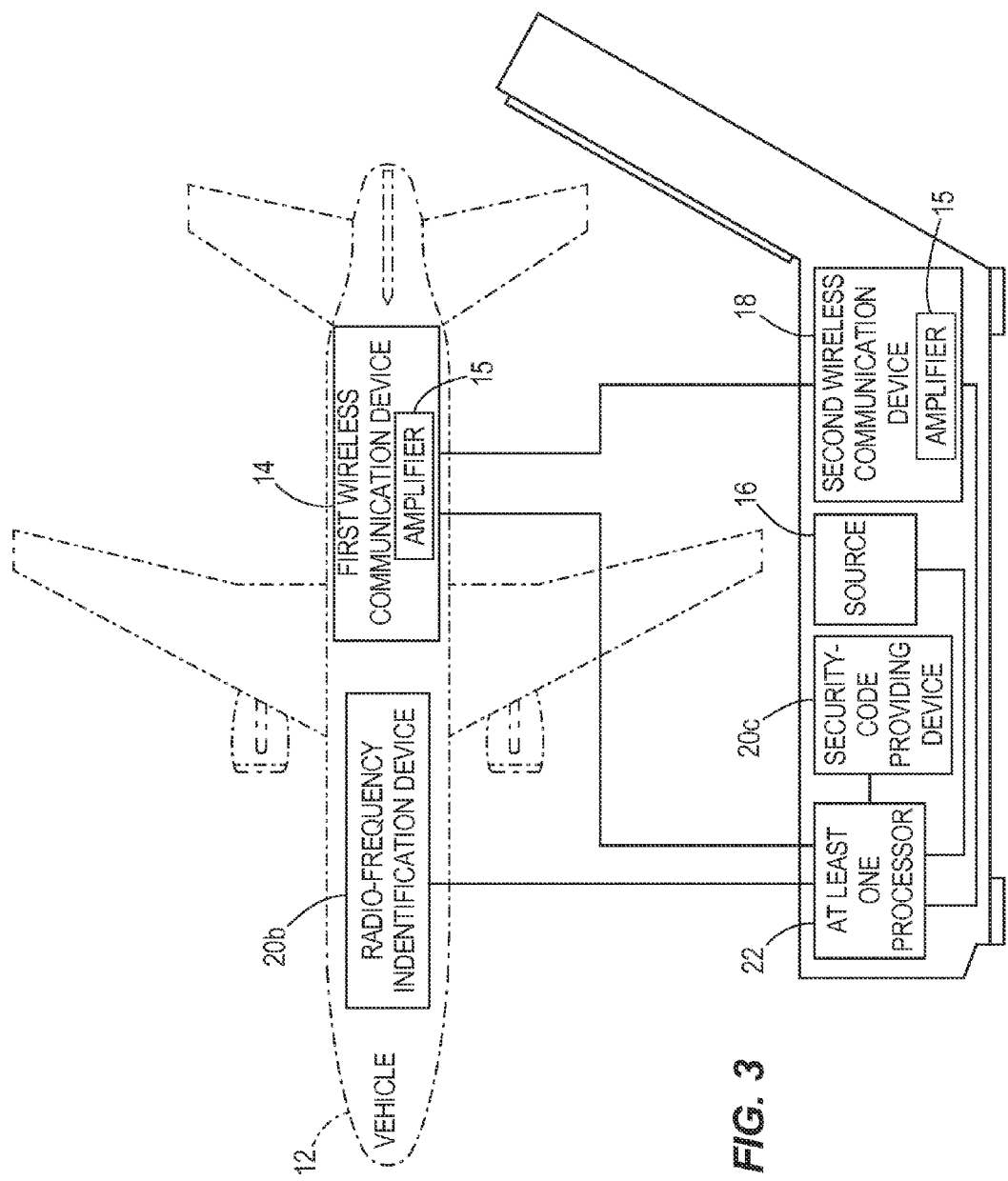
FIG. 3 illustrates another embodiment implementing another variation of the system of FIG. 1 in which the vehicle is an aircraft and the source is an aircraft terminal computer.

FIG. 3 illustrates another embodiment implementing another variation of the system of FIG. 1 in which the vehicle 12 is an aircraft and the source 16 is an aircraft terminal computer. In one embodiment, a proximity sensor is provided which senses the distance between the vehicle 12 and the source 16, a radio-frequency identification device 20b which provides an identification of the vehicle 12, and a security-code providing device 20c which provides a security code linked to the vehicle 12 and/or the source 16. The at least one processor 22 will not allow wireless communications of aircraft control data between the first wireless communication device 14 of the vehicle 12 and the second wireless communication device 18 of the source 16 until the distance between the vehicle 12 and the source 16 is less than or equal to a required distance threshold, until the vehicle 12 is identified as being the particular aircraft which is supposed to be located at that position at the aircraft terminal, and until the security code associated with that vehicle 12 and/or source 16 has been confirmed. The at least one processor 22 will only allow the amplifiers 15 of the first and second wireless communication devices 14 and 18 to amplify the wireless signal transmitting the aircraft control data if the security parameters are met by all vehicles and/or by all sources (including vehicle 12 and any other vehicles and/or including source 16 and any other sources) within the amplified wireless transmission zone. In other embodiments, a varying number and type of the at least one information device providing varying types of information may be used in conjunction with the at least one processor 22 requiring varying security parameters to be met based on the type of data to be wirelessly communicated between the first wireless communication device 14 of the vehicle 12 and the second wireless communication device 18 of the source 16 before allowing the wireless communications of the data.

For instance, in one embodiment the security parameters for allowing wireless communication of aircraft information system data between the vehicle 12 and the source 16 may only require that the distance between the vehicle 12 and the source 16 is less than or equal to a required distance threshold, and that the vehicle 12 is identified as being the particular aircraft which is supposed to be located at that position at the aircraft terminal without requiring the security code. In yet another embodiment, the security parameters for allowing wireless communication of inflight entertainment data between the first communication device 14 of the vehicle 12 and the second communication device 18 of the source 16 may only require that the distance between the vehicle 12 and the source 16 is less than or equal to a required distance threshold without requiring that the vehicle 12 be identified as being the particular aircraft which is supposed to be located at that position at the aircraft terminal and without requiring the security code.

Figure 4:
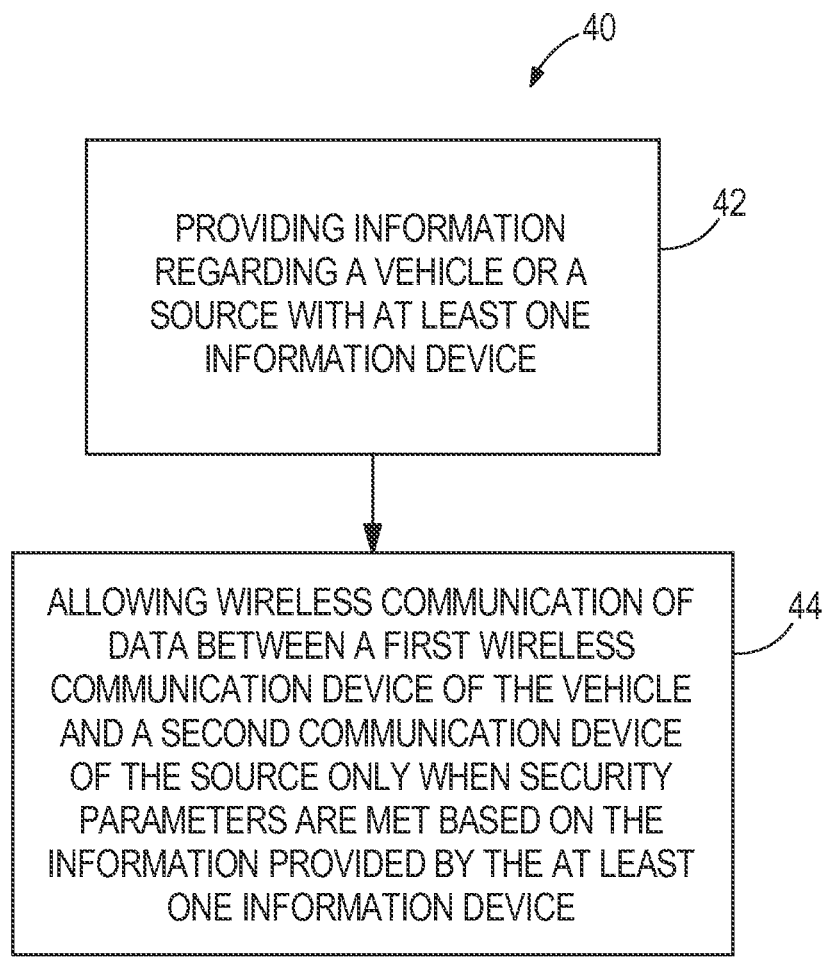
FIG. 4 is a flowchart of one embodiment of a method for securely wirelessly communicating between a vehicle and a source.

FIG. 4 is a flowchart of one embodiment of a method 40 for securely wirelessly communicating between a vehicle and a source. The method 40 may utilize the system 10 disclosed herein. In other embodiments, the method may utilize varying systems having varying components. In step 42, information is provided regarding a vehicle or a source with at least one information device. The vehicle may comprise an aircraft or another type of vehicle. The source may comprise an aircraft terminal, a land or sea based antenna, an air-traffic control system, an aircraft, a satellite, or another type of source. The at least one information device may comprise a radio-frequency identification device, a proximity sensor, a sensor, a security-code providing device, or another type of information device. In step 44, wireless communication of data between a first wireless communication device of the vehicle and a second communication device of the source is only allowed when security parameters are met based on the information provided by the at least one information device. Amplifiers of the first and second wireless communication devices may amplify the wireless signal transmitting the data if the security parameters are met by all vehicles and/or by all sources within the amplified wireless transmission zone. The security parameters may comprise a distance or location requirement of/between the vehicle and/or the source, an identification of the vehicle and/or the source, a time when the vehicle and/or the source should be at a certain location, a security code, or other types of security parameters. The security parameters which must be met for wireless communication between the vehicle and the source may vary in a number of conditions which must be met for different types of data.

For instance, the conditions which must be satisfied for wireless communication of passenger inflight entertainment data may be less than the conditions which must be satisfied for wireless communication of aircraft information system data. Similarly, the conditions which must be satisfied for wireless communication of aircraft control data may be greater than the conditions which must be satisfied for wireless communication of aircraft information system data. In other embodiments, one or more of the steps of the method 40 may be varied in substance or order, one or more steps of the method 40 may not be followed, or one or more additional steps may be added to the method 40.

One or more embodiments of the disclosure may improve the security of wireless communications between a vehicle and a source using varying levels of security parameters for data having varying levels of sensitivity. This will reduce the likelihood of a hacker obtaining unauthorized data through a cyber-attack.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A system for secure wireless communications comprising:
   a first wireless communication device configured to be disposed on a vehicle and comprising a first signal amplifier configured to amplify a data signal transmitted by the first wireless communication device;
   a second wireless communication device configured to be disposed on a source and to wirelessly communicate data with the first wireless communication device, the second wireless communication device comprising a second signal amplifier configured to amplify a second data signal transmitted by the second wireless communication device;
   at least one information device configured to provide information regarding the vehicle or the source;
   at least one processor in electronic communication with the at least one information device; and
   at least one memory in electronic communication with the at least one processor, wherein the at least one memory comprises programming code for execution by the at least one processor, and the programming code is configured to only activate the first signal amplifier and the second signal amplifier when security parameters, stored in the at least one memory, are satisfied by both the vehicle and the source, based on the information provided by the at least one information device, in order to facilitate wireless communications of the data between the first wireless communication device and the second wireless communication device.

2. The system of claim 1 wherein the vehicle comprises an aircraft.

3. The system of claim 1 wherein the source comprises an aircraft terminal, a land or sea based antenna, an air-traffic control system, an aircraft, or a satellite.

4. The system of claim 1 wherein the at least one information device comprises a radio-frequency identification device, a proximity sensor, a sensor, or a security-code providing device.

5. The system of claim 1 wherein the security parameters comprise a distance requirement between the vehicle and the source.

6. The system of claim 1 wherein the security parameters comprise an identification of the vehicle or the source.

7. The system of claim 1 wherein the security parameters comprise a time when the vehicle or the source should be at a certain location.

8. The system of claim 1 wherein the security parameters comprise a security code.

9. The system of claim 1 wherein the security parameters which must be met vary in a number of conditions which must be met for different types of the data.

10. The system of claim 1 wherein the data comprises passenger inflight entertainment data, aircraft information system data, or aircraft control data.

11. The system of claim 10 wherein the data comprises passenger inflight entertainment data, aircraft information system data, and aircraft control data, the security parameters have the most conditions which must be met when the data comprises the aircraft control data, the security parameters have the least conditions which must be met when the data comprises the inflight entertainment data, and the conditions of the security parameters which must be met for the aircraft information system data are in-between the conditions which must be met for the aircraft control data and the conditions which must be met for the inflight entertainment data.

12. A non-transitory computer readable medium including programming code to command a processor to:
   only activate a first signal amplifier for a first wireless communication device of a vehicle and a second signal amplifier for a second wireless communication device of a source, upon determining that security parameters are satisfied by both the vehicle and the source, based on information provided by at least one information device, in order to facilitate wireless communications of the data between the first wireless communication device and the second wireless communication device.

13. The non-transitory computer readable medium of claim 12 wherein the security parameters comprise a distance requirement between the vehicle and the source, an identification of the vehicle or the source, a time when the vehicle or the source should be at a certain location, or a security code.

14. The non-transitory computer readable medium of claim 12 wherein the security parameters which must be met vary in a number of conditions which must be met for different types of the data.

15. The non-transitory computer readable medium of claim 12 wherein the at least one information device comprises a radio-frequency device, a proximity sensor, a sensor, or a security-code providing device.

16. The non-transitory computer readable medium of claim 12 wherein the vehicle comprises an aircraft, the source comprises an aircraft terminal, a land or sea based antenna, an air-traffic control system, a second aircraft, or a satellite, the data comprises passenger inflight entertainment data, aircraft information system data, and aircraft control data, the security parameters have the most conditions which must be met when the data comprises the aircraft control data, the security parameters have the least conditions which must be met when the data comprises the inflight entertainment data, and the conditions of the security parameters which must be met for the aircraft information system data are in-between the conditions which must be met for the aircraft control data and the conditions which must be for the inflight entertainment data.

17. A method for securely wirelessly communicating comprising:
   providing information regarding a vehicle and a source with at least one information device; and
   only activate a first signal amplifier for a first wireless communication device of the vehicle and a second signal amplifier for a second wireless communication device of the source, upon determining that security parameters are satisfied by both the vehicle and the source, based on the information provided by the at least one information device, in order to facilitate wireless communications of the data between the first wireless communication device and the second wireless communication device.

18. The method of claim 17 wherein the vehicle comprises an aircraft.

19. The method of claim 17 wherein the source comprises an aircraft terminal, a land or sea based antenna, an air-traffic control system, an aircraft, or a satellite.

20. The method of claim 17 wherein the at least one information device comprises a radio-frequency identification device, a proximity sensor, a sensor, or a security-code providing device.

21. The method of claim 17 wherein the security parameters comprise a distance requirement between the vehicle and the source.

22. The method of claim 17 wherein the security parameters comprise an identification of the vehicle or the source.

23. The method of claim 17 wherein the security parameters comprise a time when the vehicle or the source should be at a certain location.

24. The method of claim 17 wherein the security parameters comprise a security code.

25. The method of claim 17 wherein the security parameters which must be met vary in a number of conditions which must be met for different types of the data.

26. The method of claim 17 wherein the data comprises passenger inflight entertainment data, aircraft information system data, or aircraft control data.

27. The method of claim 26 wherein the security parameters have the most conditions which must be met when the data comprises the aircraft control data, the security parameters have the least conditions which must be met when the data comprises the inflight entertainment data, and the conditions of the security parameters which must be met for the aircraft information system data are in-between the conditions which must be met for the aircraft control data and the conditions which must be for the inflight entertainment data.

* * * * *